United States Patent Office  3,591,392
Patented July 6, 1971

3,591,392
HIGH ALUMINA BRICK AND METHOD
OF MAKING
Wate T. Bakker, Severna Park, Md., assignor to General
Refractories Company, Philadelphia, Pa.
No Drawing. Filed July 1, 1968, Ser. No. 741,333
Int. Cl. C04b 35/10, 35/18
U.S. Cl. 106—62                                   20 Claims

ABSTRACT OF THE DISCLOSURE

To a high alumina brick batch mix containing from about 85 to about 95% of alumina and from about 5 to about 15% of silica, based on the combined weight of said alumina and silica, including the usual small amounts of impurities associated with the alumina and silica, are added a lithium compound and at least one of an alkaline earth metal compound and iron oxide, the total of such additions being materially less than 1%, by weight, based on 100 parts of said combined alumina and silica, to improve the strength and volume stability of the resulting brick without adversely affecting its refractoriness under load.

BACKGROUND OF THE INVENTION

This invention relates generally to refractories of high alumina content, generally in the range of from about 85 to about 95%, of alumina, the balance being essentially silica, with minor amounts of impurities such as $TiO_2$, $Fe_2O_3$, alkalies and alkaline earths normally associated with the alumina and silica. These bricks are generally manufactured from high purity, high density $Al_2O_3$ grog material and a siliceous binder. Traditional forms of silica used for this purpose are various kinds of clays, usually kaolin or ball clay, and ground silica sand. The use of clay, at least in large amounts, is objectionable because during firing the clay decomposes into mullite and a glassy phase, the glassy phase forming the bond between the grog grain, which structure decreases the refractoriness of the brick under load. The use of ground silica, on the other hand, increases the refractoriness under load of the brick, probably because the silica reacts with the alumina in the solid state to form mullite so that little or no glass is formed. However, because of the low reactivity of the silica, this reaction is slow and only very little mullite is formed at conventional burning temperatures. Therefore, these refractories have a low cold strength and most of the mullite in the brick is formed during service leading to an undesirable large reheat expansion.

It is the principal object of the present invention to provide a high alumina, silica-containing refractory brick batch mix providing a burned brick having a high cold strength and a low reheat expansion.

It is another object of the present invention to provide a high alumina, silica-containing brick batch mix providing a brick having a high cold strength, a low reheat expansion and decreased apparent porosity, all without impairment of its refractoriness under load.

It is a further object of the present invention to provide a high alumina, silica-containing refractory brick batch mix providing a brick having the improved properties as aforesaid and also improved refractoriness under load.

Other objects, including the provision of a method of making the novel brick, will become apparent from a consideration of the following specification and the claims.

SUMMARY OF THE INVENTION

The present invention is based upon the discovery that the addition, to the alumina-silica brick batch mix, of a small amount of a lithium compound, as hereinafter discussed more in detail, plus a small amount of at least one of an alkaline earth metal compound and an iron compound, as discussed more in detail hereinafter, increases the cold strength of the resulting burned brick while at the same time decreasing its reheat expansion and its apparent porosity without deleteriously affecting its refractoriness under load. In fact, improvement in the refractoriness under load has been realized through the addition of the stated combination or compounds.

Hence, the present invention involves, in a high alumina refractory brick match mix consisting essentially of from about 85 to about 95%, by weight, of alumina and from about 5 to about 15%, by weight, of silica, said percentages being based on the combined weight of said alumina and said silica, the improvement comprising: in addition, as added materials, of between 0.05 and 0.2% of at least one lithium compound selected from the group consisting of lithium fluoride and lithium carbonate and from about 0.01 to 0.3% of at least one other compound selected from the group consisting of calcium hydroxide, magnesium hydroxide and iron oxide, said amounts of lithium compound and other compound being by weight based on 100 parts of combined alumina and silica.

DESCRIPTION OF THE PREFERRED EMBODIMENTS

With respect to the alumina grog employed in preparing the brick batch mix, it may be sintered or tabular alumina, fused alumina, calcined alumina, and the like. Generally the alumina employed will contain at least 99% $Al_2O_3$, preferably at least 99.5% $Al_2O_3$. As is common in high alumina refractory brick manufacture, a portion of the alumina will be relatively coarse particles, and a portion will be relatively fine. Thus, from about 50 to about 65%, by weight, of the alumina will be −6+48 mesh (Tyler) and the balance (from about 35 to about 50%, by weight) will be −48 mesh. Preferably at least about 10%, say from about 10 to about 30%, by weight, of the alumina will be −325 mesh.

As to the silica component, this will generally also be of high purity material containing at least 99% $SiO_2$, preferably over 99.5% $SiO_2$ and especially about 99.9% $SiO_2$. In this connection, ground glass sand is particularly suitable. The silica will generally all be substantialy −200 mesh, and preferably at least 50%, by weight, thereof will be −325 mesh.

Although the alumina and the silica may contain a very small amount of impurities like alkalies, alkaline earths and iron oxide, these apparently do not function in the same manner as the added materials incorporated in the mix according to the present invention.

As stated, one of the materials added to the mix in accordance with the present invention is lithium fluoride or lithium carbonate. Lithium carbonate decomposes during burning of the brick to lithium oxide, so that it will be apparent that lithium oxide itself or other lithium compound that decomposes, during burning of the brick, to lithium oxide, would be the equivalent; lithium carbonate being the preferred choice of these because of its relative cheapness and ease of handling. Of all the lithium compounds, however, lithium fluoride is preferred. The lithium compound should be relatively finely divided, that is substantially all thereof should be —100 mesh, and preferably substantially all thereof is —325 mesh. The amount of lithium compound added to the mix (based on 100 parts of alumina plus silica) should be less than 0.2%. Higher amounts markedly decrease the refractoriness under load of the resulting brick. Generally the amount of lithium compound employed is from about 0.05 to about 0.15%, and preferably from about 0.05 to about 0.1%.

The other principal additive incorporated in the mix according to the present invention is at least one of calcium hydroxide, magnesium hydroxide and iron oxide. These materials, as is the case with the lithium compound, should be relatively fine so that substantially all thereof will be —100 mesh, and preferably substantially all thereof will be —325 mesh. Calcium hydroxide and magnesium hydroxide are preferably selected because of the ease with which they are obtained in such finely divided form and because of the ease of handling them. However, it is apparent that the calcium hydroxide and magnesium hydroxide decompose to their respective oxides during burning of the brick so that calcium oxide and magnesium oxide, or other calcium and magnesium compounds which likewise decompose to the oxide during burning of the brick such as the respective carbonates, could serve as the equivalent of the stated calcium hydroxide and magnesium hydroxide. Iron oxide as $Fe_2O_3$ is also preferably selected as the iron oxide because of its ready availability in such finely-divided form. It is also apparent that other iron compounds that decompose to $Fe_2O_3$ during burning of the brick would be the equivalent of the iron oxide employed.

While any one or any combination of the stated calcium hydroxide, magnesium hydroxide and iron oxide may be used as the second additive in accordance with the present invention, the preferred second additive will be at least one of calcium hydroxide and magnesium hydroxide.

The amount of the second additive added should be at least about 0.01% but should not exceed about 0.3%. Preferably, in the case of calcium hydroxide and magnesium hydroxide, the amount employed is not over about 0.2% and more especially not over 0.15%. In accordance with preferred practice, the amount of calcium hydroxide and/or magnesium hydroxide ranges from about 0.02 to about 0.05%. When iron oxide ($Fe_2O_3$) is employed, it is preferably in an amount from about 0.025 to about 0.05%.

There also appears to be a preferred weight ratio relationship between the lithium compound and the second additive compound in the neighborhood of about 1:1.

As stated, the refractory brick batch mix of the present invention consists essentially of the alumina and the silica with the recited additives in the amounts stated. Of course, small amounts of other materials may be added to the batch mix without deleteriously affecting the properties of the resulting brick. For example, a small amount, less than 5%, by weight, based on 100 parts of alumina plus silica, and preferably from about 2 to about 3%, of a refractory plastic clay may be included to serve as a plasticizer and a green strength binder. Examples of such clays are plastic kaolin, which is preferred, and ball clay. In addition, phosphoric acid may be included as enhancing cold strength, particularly when a clay is employed. Other binders, such as sodium lignosulfonate may be included to impart green strength and lubrication. When phosphoric acid is employed, it may be used in the amount of from about 1 to about 4%, preferably from about 2 to about 3% (as a 75% aqueous solution of $H_3PO_4$), based on 100 parts of alumina plus silica. When a lignosulfonate binder is employed, it may be used in an amount of from about 1 to about 2% as a 50% solution in water or from about 0.5 to about 1%, on a dry basis.

As is customary in preparing bricks, the mix will be tempered with a small amount of water. Some or all of the water may be provided by binders of the type discussed above. In general, the total water will range from about 2.5 to about 6%, preferably from about 3 to about 5%, by weight, based on 100 parts of the alumina plus silica.

In preparing the mix, the materials will be mixed in accordance with conventional refractory practice. For example, a muller mixer may be employed in which case it is preferred to add the more coarse materials to the pan first, then the major portion of the moisture followed by the finer materials then the remainder of the moisture to proper consistency. The tempered mix is then pressed into the desired refractory brick shape. Generally, a pressure of at least about 4,000 p.s.i. is employed and this may range up to about 15,000 p.s.i., with a preferred pressure being from about 8,000 to about 10,000 p.s.i.

The shaped brick is then fired to provide the ceramic bond for example, at a temperature which may range from about 1200 to about 1500° C.

The invention will be more readily understood from a consideration of the following specific examples which are given for the purpose of illustration and are not intended to limit the scope of the invention in any way.

Examples v–4

In these examples a brick batch mix is prepared from: 50%, by weight, —6 mesh tabular alumina; 25% —48 mesh tabular alumina; 15% —325 mesh calcined alumina, and 10% —200 mesh ground silica. To portions of the mix are added various materials as set forth in the following table. Each mix is then tempered with an aqueous sodium lignosulfonate solution and pressed into 6½ x 1½ x 1½" bricks at 6000 p.s.i. The bricks are fired at 1450° C. The properties of the fired specimens are set forth in the following table:

| Example | Additive | Fired density (oz./in.³) | Apparent porosity (percent) | MOR (p.s.i.) | Linear reheat change at 3,100° F. (percent) |
|---|---|---|---|---|---|
| 1 | | 1.56 | 23.5 | 1,840 | +1.15 |
| 2 | 0.2% LiF | 1.59 | 20.4 | 2,240 | +1.42 |
| 3 | 0.1% Mg(CH)₂, 0.1% Ca(OH)₂, 0.1% Fe₂O₃ | 1.59 | 22.4 | 2,790 | +1.16 |
| 4 | 0.1% LiF, 0.06% Ca(OH)₂, 0.1% Mg(OH)₂, 0.05% Fe₂O₃ | 1.59 | 21.2 | 3,070 | +0.99 |

Examples 5–7

In these examples a brick batch mix is prepared from: 50%, by weight, —6 mesh tabular alumina; 25% —48 mesh tabular alumina; 15% —325 mesh calcined alumina, and 10% —200 mesh ground silica. Three percent of fine aluminum hydroxide (below about 1 micron, and averaging about 0.7 micron, in size) is also added to the mix. Various materials as set forth in the following table are added to portions of the mix. Each mix is then tempered with aqueous sodium lignosulfonate and pressed, at 8000 p.s.i., into brick 9 x 4½ x 2½ inches which are then fired at 1450° C. following standard refractory manufacturing practice. The properties of the brick are set forth in the following table.

| Example | Additive | Fired density (oz./in.³) | Apparent porosity (percent) | MOR (p.s.i.) | Linear reheat change, 3,100° F. (percent) | Deformation under load* |
|---|---|---|---|---|---|---|
| 5 | | 1.61 | 23.0 | 2,730 | +1.66 | 0 |
| 6 | 0.05% LiF, 0.05% Ca(OH)₂ | 1.64 | 21.6 | 3,320 | +1.17 | 0 |
| 7 | 0.1% LiF, 0.1% Mg(OH)₂ | 1.66 | 18.6 | 3,740 | +1.66 | 0 |

*5 hours at 3,000° F.

The foregoing data show that LiF plus either Ca(OH)₂ or MG(OH)₂ increases the strength of the brick and decreases the apparent porosity and reheat expansion of the brick.

Examples 8–11

In these examples a brick batch mix is prepared from: 51%, by weight, −6 mesh fused alumina (99.5% Al₂O₃); 26% −48 mesh tabular alumina, 15% −325 mesh calcined alumina and 8% −200 mesh ground silica, to which is added 3% plastic kaolin and 3% of a 75% aqueous phosphoric acid solution. To portions of this mix are added various materials as set forth in the following table. Each mix is then tempered with 2–4% water, pressed into 9 x 4½ x 2½″ bricks at 800 p.s.i., and fired at 1450° C. for 5 hours using standard refractory manufacturing procedures. The properties of the brick are set forth in the following table:

| | | | | | Linear reheat change, 3,100° F. | Deformation under load (percent)* | |
|---|---|---|---|---|---|---|---|
| Example | Additive | Fired density (oz./in.³) | Apparent porosity (percent) | MOR (p.s.i.) | (percent) | 1½ hrs. | 5 hrs. |
| 8 | | 1.74 | 17.2 | 2,390 | +1.21 | −0.88 | −3.3 |
| 9 | 0.1% Li₂CO₃ | 1.76 | 17.5 | 2,250 | +0.77 | −1.32 | |
| 10 | 0.05% LiF, 0.05% Mg(OH)₂ | 1.74 | 16.1 | 3,530 | +0.66 | −0.1 | −0.77 |
| 11 | 0.1% LiF, 0.05% Mg(OH)₂, 0.05% Ca(OH)₂ | 1.76 | 15.7 | 3,810 | +0.61 | 0 | −0.33 |

*At 3,000° F.

The foregoing data show, in addition to increased strength and decreased apparent porosity and reheat expansion with the combination of lithium compound and alkaline earth compound, the improved refractoriness under load with such combination whereas the lithium compound alone is detrimental to refractoriness under load.

Modification is possible in the selection of materials, particularly the exact chemical nature of the additives, and in the techniques employed without departing from the scope of the invention.

What is claimed is:

1. In a refractory brick batch mix consisting essentially of from about 85 to about 95%, by weight, of −6 mesh alumina and from about 5 to about 15%, by weight, of −200 mesh silica, based on the combined weight of said alumina and said silica, the improvement comprising, in addition as added materials, between 0.05 and 0.2% of at least one lithium compound selected from the group consisting of lithium fluoride and lithium carbonate and from about 0.01 to about 0.3 % of at least one other compound selected from the group consisting of calcium hydroxide, magnesium hydroxide and iron oxide, said amounts of lithium compound and other compound being based on 100 parts of combined alumina and silica.

2. The composition of claim 1 wherein said lithium compound is present in an amount not over about 0.15%.

3. The composition of claim 2 wherein said lithium compound is present in an amount not over about 0.10%.

4. The composition of claim 1 wherein the total of said lithium compound and said other compound is not over about 0.3%.

5. The composition of claim 1 wherein said other compound is at least one of those selected from the group consisting of calcium hydroxide and magnesium hydroxide and is present in an amount not over about 0.2%.

6. The composition of claim 5 wherein said other compound is calcium hydroxide and is present in an amount not over 0.15%.

7. The composition of claim 6 wherein said calcium hydroxide is present in an amount from about 0.02 to about 0.05%.

8. The composition of claim 5 wherein said other compound is magnesium hydroxide and is present in an amount not over 0.15%.

9. The composition of claim 8 wherein said magnesium hydroxide is present in an amount from about 0.02 to about 0.05%.

10. The composition of claim 5 wherein said lithium compound is present in an amount not over about 0.15%.

11. The composition of claim 1 wherein from about 50 to about 65% of said alumina is −6 +48 mesh; wherein from about 35 to about 50% of said alumina is −48 mesh, and wherein at least 50% of said silica is −325 mesh.

12. The composition of claim 11 wherein from about 10 to about 30% of said alumina is −325 mesh.

13. The composition of claim 1 wherein said lithium compound and said other compound are substantially all −100 mesh.

14. The composition of claim 13 wherein said lithium compound and said other compound are substantially all −325 mesh.

15. In the preparation of high alumina refractory burned brick wherein a brick batch mix consisting essentially of from about 85 to about 95%, by weight, of −6 mesh alumina and from about 5 to about 15%, by weight, of −200 mesh silica, based on the combined weight of said alumina and said silica, is pressed into brick form and fired, the improvement wherein said brick batch mix has as added materials, between 0.05 and 0.2% of at least one lithium compound selected from the group consisting of lithium fluoride and lithium carbonate and from about 0.01 to about 0.3% of at least one other compound selected from the group consisting of calcium hydroxide, magnesium hydroxide, and iron oxide, said amounts of lithium compound and other compound being based on 100 parts of combined alumina and silica.

16. In the preparation of a high alumina refractory burned brick wherein a brick batch mix consisting essentially of from about 85 to about 95%, by weight, of alumina and from about 5 to about 15%, by weight, of −200 mesh silica, based on the combined weight of said alumina and said silica, is pressed into brick form and fired, the improvement wherein said brick batch mix has as added materials, between 0.05 and 0.2% of at least one lithium compound selected from the group consisting of lithium fluoride and lithium carbonate and from about 0.01 to about 0.3% of at least one other compound selected from the group consisting of calcium hydroxide, magnesium hydroxide, and iron oxide, said amounts of lithium compound and other compound being based on 100 parts of combined alumina and silica.

17. The method of claim 16 wherein the total of said lithium compound and said other compound is not over about 0.3%.

18. The method of claim 15, wherein the total of said lithium compound and said other compound is not over about 0.3%.

19. The method of claim 15, wherein said other compound is at least one of those selected from the group consisting of calcium hydroxide and magnesium hydroxide and is present in an amount not over about 0.2%.

20. The method of claim 16, wherein from about 50 to about 65% of said alumina is −6 +48 mesh; wherein from about 35 to about 50% of said alumina is −48 mesh and wherein at least 50% of said silica is 325 mesh.

References Cited

UNITED STATES PATENTS

| | | | |
|---|---|---|---|
| 2,559,343 | 7/1951 | Caton | 106—65 |
| 3,220,862 | 11/1965 | Miller | 106—65 |

JAMES E. POER, Primary Examiner

U.S. Cl. X.R.

106—65